April 28, 1970 J. J. DRISCOLL 3,509,286

CODE TRANSMITTER UTILIZING A PRINTED CIRCUIT DISC

Filed April 1, 1966 4 Sheets-Sheet 1

INVENTOR
J. J. DRISCOLL
BY
ATTORNEY

CODE TRANSMITTER UTILIZING A PRINTED CIRCUIT DISC

Filed April 1, 1966 4 Sheets-Sheet 2

CODE TRANSMITTER UTILIZING A PRINTED CIRCUIT DISC

Filed April 1, 1966 4 Sheets-Sheet 3

April 28, 1970 J. J. DRISCOLL 3,509,286

CODE TRANSMITTER UTILIZING A PRINTED CIRCUIT DISC

Filed April 1, 1966 4 Sheets-Sheet 4

United States Patent Office 3,509,286
Patented Apr. 28, 1970

3,509,286
CODE TRANSMITTER UTILIZING A PRINTED CIRCUIT DISC

John J. Driscoll, Keyport, N.J., assignor to Bell Telephone Laboratories, Incorporated, New York, N.Y., a corporation of New York Filed Apr. 1, 1966, Ser. No. 539,468
Int. Cl. H04m 3/42
U.S. Cl. 179—90 1 Claim

ABSTRACT OF THE DISCLOSURE

The apparatus includes groups of slide selector switches, a like number of groups of slow sequential actuated switches and a group of fast sequentially actuated switches provided by the interaction of contacts with conductive areas on a printed circuit board. The slide switches, slow switches, and fast switches are interconnected by conductive paths extending through the printed circuit board to form a switching matrix having a unique configuration, and the matrix is connected in series with the latching coil of a relay across a power source. When a path is provided through the switching matrix, the latching coil is energized to remove a shunt from across a pulsing switch. A pulse is thereafter transmitted concurrent with each actuation of a fast switch until the sequential actuation of the fast switches then in progress is completed, and an unlatching coil of the relay is thereupon energized to terminate the transmission of pulses.

This invention relates to code transmitters and particularly to automatic call transmitters.

In the copending application of N. L. Field III and R. E. Waddell, Ser. No. 539,409, filed Apr. 1, 1966 and assigned to the assignee of the present application, an automatic call transmitter is disclosed that features a switching matrix comprising pluralities of first, second, and third switches.

The first plurality of switches is actuated selectively while the second and third pluralities of switches are actuated sequentially. There is a like number of first and second switches and each first switch is connected in series with an individual second switch. In addition, the pairs of series connected first and second switches are arranged in groups with the pairs of series connected first and second switches in each group connected in parallel with one another. Finally, each group of first and second switches is connected in series with an individual third switch, each third switch and the group of first and second switches in series therewith being connected in parallel with each other third switch and the group of first and second switches in series therewith.

The switching matrix in the copending application is connected in parallel with a pulsing switch across a telephone line, and the pulsing switch interrupts the telephone line and transmits a pulse thereover concurrent with each actuation of a third switch until a path is provided through the switching matrix. Thereafter no further pulses are transmitted until a subsequent sequential actuation of the third switches commences.

In the present invention, the same switching matrix and pulsing switch are employed; however, the switching matrix is isolated from the telephone line and is only connected in series with a latching relay across a power source. The pulsing switch is connected in parallel with a normally closed switch of the latching relay and both switches are connected across the telephone line.

As a result, the pulsing switch commences to interrupt the telephone line only after a path is provided through the switching matrix and the relay is energized to open the normally closed relay switch. Due to the latching of the relay, the normally closed relay switch remains open and pulses are thereby transmitted until the end of the sequence of the third switches then in progress. At the end of each sequence, the relay is unlatched and the pulsing switch is once more shunted by the normally closed relay switch.

A complete understanding of the invention and of these and other features and advantages thereof may be gained from consideration of the following detailed description which in conjunction with the accompanying drawing discloses one embodiment of the invention. It is to be expressly understood, however, that the drawing and description are not to be construed as defining the limits of the invention.

Figure 1:
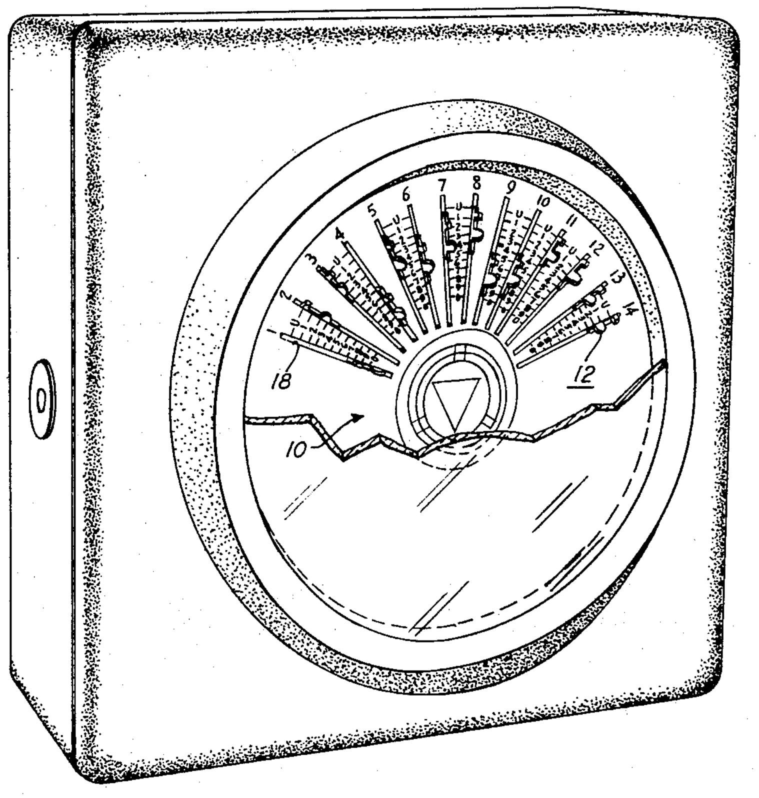
FIG. 1 is a perspective view of a telephone embodying the automatic call transmitter of this invention.
Figure 2:
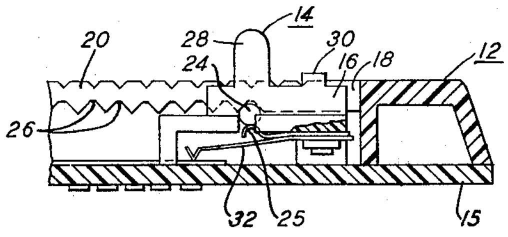
FIG. 2 is a sectional view showing one of the digit selectors and a portion of the face plate and printed circuit board with which it interacts, these being the elements involved in selecting a particular number to be called by the call transmitter.

Referring to the drawings and FIGS. 1 and 2 in particular, in the embodiment of the call transmitter herein disclosed, the call transmitter comprises a preset dial 10 that includes a slide selector switch 12, a detailed description of which is found in U.S. Patent 3,308,250 issued to N. L. Field III and J. F. Ritchey on Mar. 7, 1967.

The slide selector switch 12 includes a plurality of digit selectors 14, there advantageously being fourteen selectors to permit the selection of a telephone number up to fourteen digits in length. Each selector 14 rides on a printed circuit board 15 and has an upstanding ridge 16 that extends into a slot 18 in a face plate 20 fastened to a printed circuit board, each selector being thereby restrained to move along the length of its associated slot.

In addition, each selector 14 includes a cylindrical detent 24 that is biased by a spring member 25 into engagement with eleven abutting V-shaped notches 26 on the underside of the face plate 20, and the interaction therebetween limits the location of each selector along the length of its associated slot 18 to eleven discrete positions.

Each selector 14 further includes a tab 28 and a boss 30 that extend from the ridge 16 above the upper surface of the face plate 20. The tab 28 of each selector 14 is used to displace the selector from one of its discrete positions to another, while the boss 30 serves as a marker for indicating the particular position that the selector is in according to indicia adjacent to each slot 18. The indicia comprise the letter U, which stands for unused, and the digits 1 through 0, and in each discrete position of a selector 14, the boss 30 thereof is aligned with one of the indicia.

Figure 3:
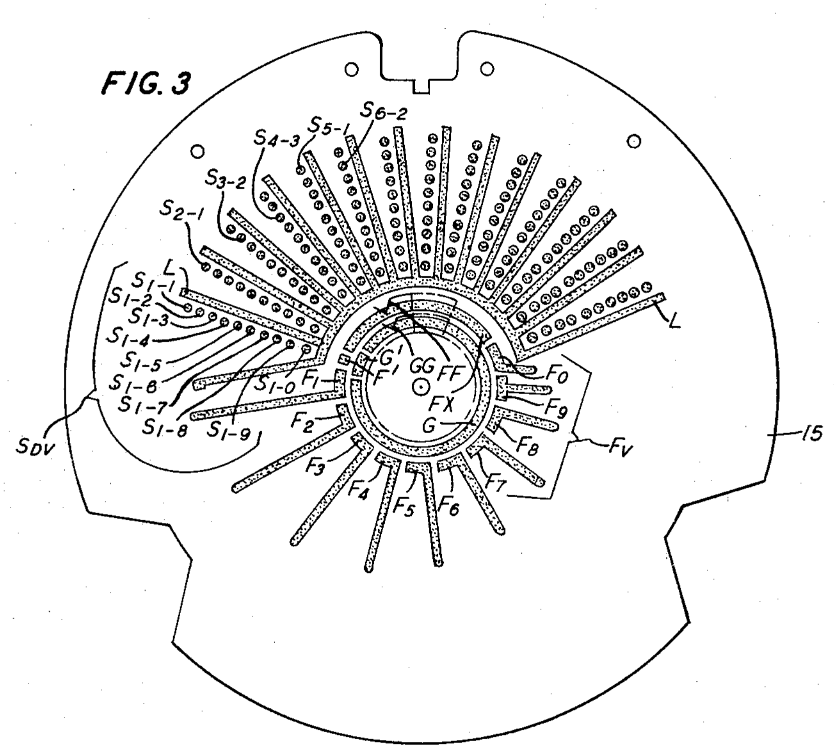
FIG. 3 is a top view of the printed circuit board.

Referring now to FIGS. 2 and 3, each selector 14 includes a pair of contacts 32, only one of which is shown. The contacts 32 are electrically connected together and are biased toward the printed circuit board 15. One contact 32 of each selector 14 engages an elongated conductor L, the conductors L extending radially from a common arcuate conductor and being connected to one another thereby.

The other contact 32 of each selector 14 engages one of ten abbreviated conductors spaced parallel to an adjacent conductor L. Each abbreviated conductor is designated according to the digit and the value that it represents. Thus the abbreviated conductors associated with the selector 14 for the first digit are respectively designated $S_{1-1}$, $S_{1-2}$, $S_{1-3}$, $S_{1-4}$, $S_{1-5}$, $S_{1-6}$, $S_{1-7}$, $S_{1-8}$, $S_{1-9}$, and $S_{1-0}$. Likewise, the abbreviated conductors associated with the selector 14 for the sixth digit are designated $S_{6-1}$, $S_{6-2}$, $S_{6-3}$, and so on. The abbreviated conductors as a group may therefore be designated $S_{DV}$, the subscript D standing for digit and varying from 1 to 14, and the subscript V standing for value and varying from 1 to 0.

It is seen that the contacts 32 of each selector 14 serve to electrically connect the associated conductor L to one of the conductors $S_{DV}$ adjacent thereto, and the particular conductor $S_{DV}$ to which the conductor L is connected corresponds to the position of the selector. Thus when the selector 14 for the first digit is positioned with the boss 30 thereof in alignment with the indicium 9, the contacts 32 of the selector connect the conductor L to the conductor $S_{1-9}$. Similarly, when the selector 14 for the fourth digit is positioned with the boss 30 thereof in alignment with the indicium 7, the contacts 32 of the selector connect the conductor L to the conductor $S_{4-7}$. However, when the selector 14 for a digit is positioned with the boss 30 thereof in alignment with the indicium U, the contacts 32 of the selector do not connect the conductor L to any of the conductors $S_{DV}$.

The interaction of the contacts 32 of the selectors 14 with the conductors $S_{DV}$ and L associated therewith provides the equivalent of ten groups of normally open switches with fourteen switches in each group. For purposes of schematic representation this plurality of groups of normally open selectively actuated switches is designated $S_{DV}L$, the switch designation corresponding to the conductors interconnected by the contacts.

Figure 4:
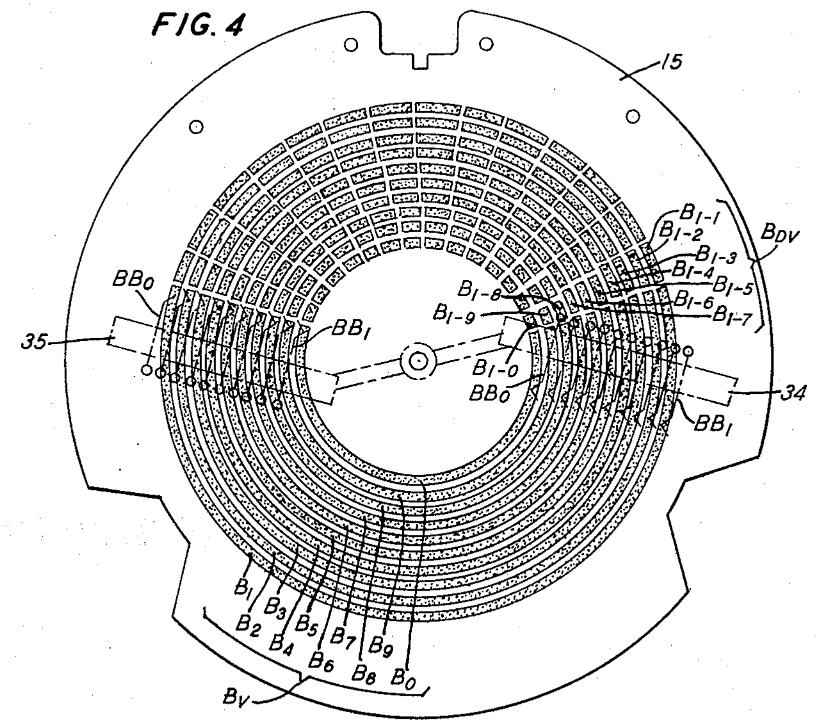
FIG. 4 is a bottom view of the printed circuit board.

Referring now to FIG. 4, each conductor $S_{DV}$ is connected through the printed circuit board 15 to another individual conductor on the underside of the printed circuit board. This second group of conductors is designated as $B_{DV}$, and the subscripts assigned to these conductors are the same as those assigned to the conductor $S_{DV}$ that they are connected to. Thus the conductor $B_{1-9}$ is electrically connected to the conductor $S_{1-9}$, the conductor $B_{4-7}$ is electrically connected to the conductor $S_{4-7}$, and so on. The conductors $B_{DV}$ comprise abbreviated arcs and those having the same value, that is, the same subscript V, extend along a common circular center line, the center lines being concentric.

The underside of the printed circuit board 15 also has a group of conductors designated $B_V$. The conductors $B_V$ are elongated arcs, and they extend along the same circular center lines and the conductors $B_{VD}$. As would be expected, the subscript V assigned to an individual conductor $B_V$ corresponds to the subscript V assigned to each of the conductors $B_{DV}$ extending along the same center line. Thus the outermost conductor $B_V$ is designated $B_1$ while the innermost conductor is designated $B_0$.

Referring again to FIG. 3, each of the conductors $B_V$ is connected through the printed circuit board 15 to radial conductors on the upper surface of the printed circuit board that connects each of the conductors $B_V$ to an individual conductor designated $F_V$. The conductors $F_V$ are short arcs and all extend along a comon circular center line. The subscript V assigned to each conductor $F_V$ is the same as that of the conductor $B_V$ to which it is connected. Thus the conductor $F_1$ is electrically connected to the conductor $B_1$, the conductor $F_2$ is electrically connected to the conductor $B_2$, and so on.

The upper surface of the printed circuit board 15 also has an abbreviated conductor F′ and an elongated semicircular conductor FX that lie along the same circular center line as the conductors $F_V$. In addition, the upper surface of the printed circuit board 15 has a circular conductor G and an abbreviated conductor G′ that lie along a common circular center line concentric with the center line of the conductors $F_V$. The conductor G is located adjacent to the conductors $F_V$ and FX while the conductor G′ is located adjacent to the conductor F′.

Figures 5, 6:
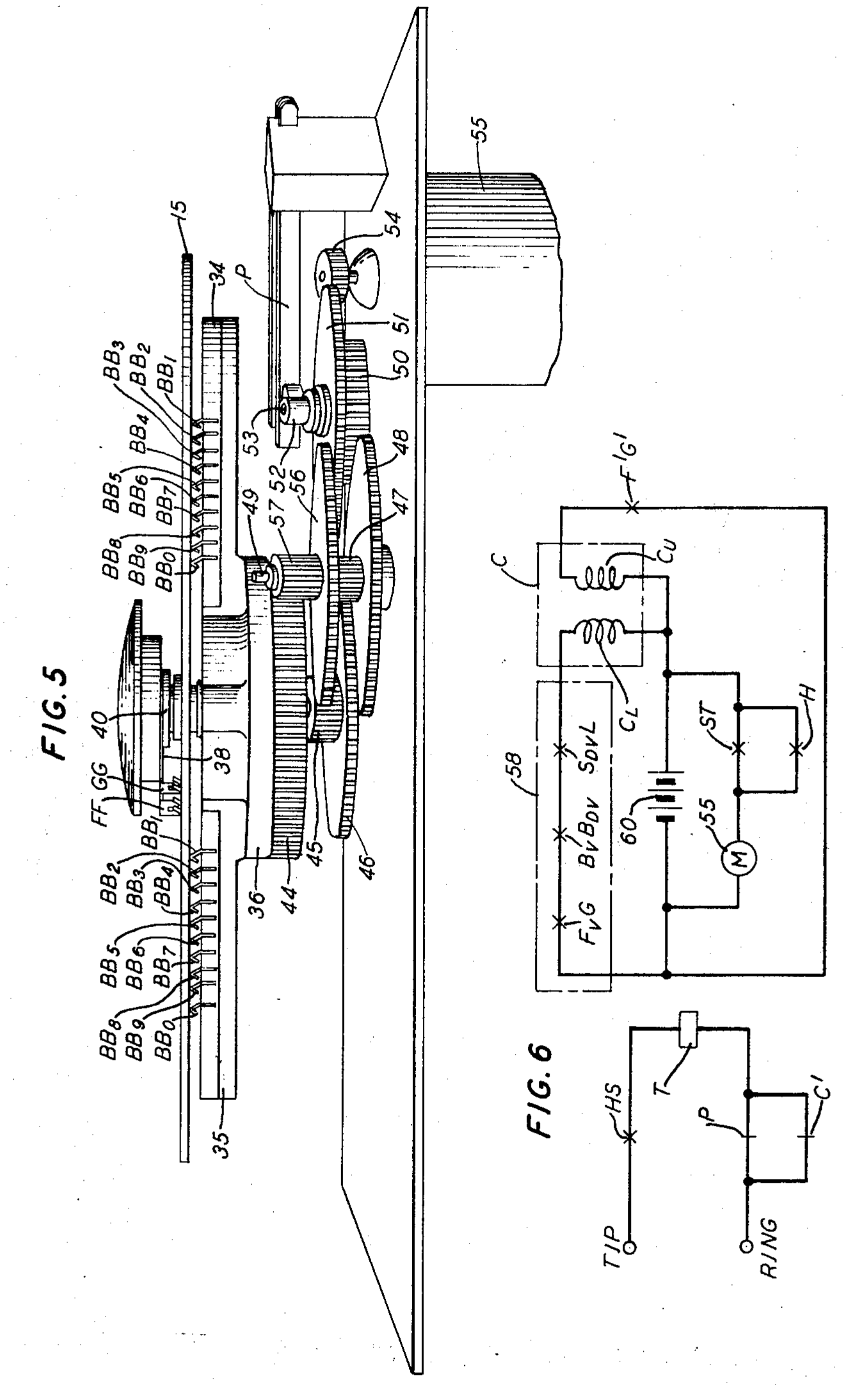
FIG. 5 is a side view of the call transmitter with the face plate and the digit selectors removed.
FIG. 6 is a schematic circuit of the call transmitter.

Referring now to FIGS. 4 and 5, the conductors on the underside of the printed circuit board 15 are engaged by two groups of contacts, the groups of contacts being respectively mounted on arms 34 and 35 that extend radially from a hub 36. The contacts in each group are designated $BB_1$ through $BB_0$, and they are supported so as to be spaced from and electrically insulated from one another. However, each contact in one group is electrically connected to the corresponding contact in the other group, and the pair engage the center line of the corresponding conductors $B_{DV}$ and $B_V$.

As shown in FIGS. 3 and 5, in a similar manner, the conductors $F_V$, F′, and FX are engaged by a contact FF and the conductors G and G′ are engaged by the contact GG. The contacts FF and GG are mounted on an arm 38 extending from a hub 40 and electrically connected to one another. The hubs 36 and 40 are both mounted on a common shaft, the hub 36 being secured to a gear 44 that is rotatively mounted on the shaft and the hub 40 being fixedly mounted on the shaft. A pair of gears 45 and 46 are also fixedly mounted on the same shaft.

The gear 46 meshes with a gear 47 fixedly mounted with a gear 48 on a shaft 49. The gear 48 in turn meshes with a gear 50 fixedly mounted with a gear 51 and a cam 52 on a shaft 53. Finally, the gear 51 meshes with a gear 54 fixedly mounted on the shaft of a motor 55. Advantageously, the motor 55 and gears 46, 47, 48, 50, 51, and 54 are selected to provide the cam 52 with a speed of 600 revolutions per minute and the hub 40, and thereby the contacts FF and $GG_1$, with a speed of 37.5 revolutions per minute. The cam 52 interacts with a pair of contacts to provide a normally closed pulsing switch P that opens and closes ten times a second.

The gear 45, which rotates at the same speed as the hub 40, meshes with a gear 56 rotatively mounted with a gear 57 on the shaft 49. The gear 57 meshes in turn with the gear 44. Advantageously the gears 44, 45, 56, and 57 are chosen to provide the hub 36, and thereby the contacts $BB_V$, with a speed of 1.1 revolutions per minute. This results in the contacts FF and GG rotating through 34 revolutions in the same time that the contacts $BB_V$ rotate through a single revolution. The contacts FF and GG rotate in a clockwise direction, while the contacts $BB_V$ rotate in a counterclockwise direction.

Referring now to FIGS. 3, 5 and 6, the interaction of the contacts FF and GG with the conductors $F_V$ and G respectively provides the equivalent of ten switches designated $F_VG$, and the interaction of the contacts with the conductors F′ and G′ provides the equivalent of a switch designated F′G′. However, the interaction of the contacts FF and GG with the conductors FX and G respectively provides no switch inasmuch as the conductor FX serves only to provide a running surface between the conductors F′ and $F_0$. The switches $F_VG$ and F′G′ are actuated in sequence, and they are normally open. That is, they are open when the call transmitter is in the home position, which is the position illustrated in FIG. 3.

The speed of rotation of the contacts FF and GG and the length of the conductors $F_V$ are such that the switches $F_VG$ close and open at the same frequency as the pulsing switch P. Furthermore, the switches $F_VG$ are synchronized with the pulsing switch P so that the pulsing switch is closed at the time that an individual switch $F_VG$ closes.

Turning to FIGS. 4, 5 and 6, the interaction of the contacts $BB_V$ with the conductors $B_V$ and $B_{DV}$ provides the equivalent of ten groups of normally open switches designated $B_VB_{DV}$. There are fourteen switches in each group, and the switches in each group are actuated in sequence. In addition, a single switch in each group of switches $B_VB_{DV}$ is actuated for each sequential actuation of the switches $F_VG$.

Figure 6A:
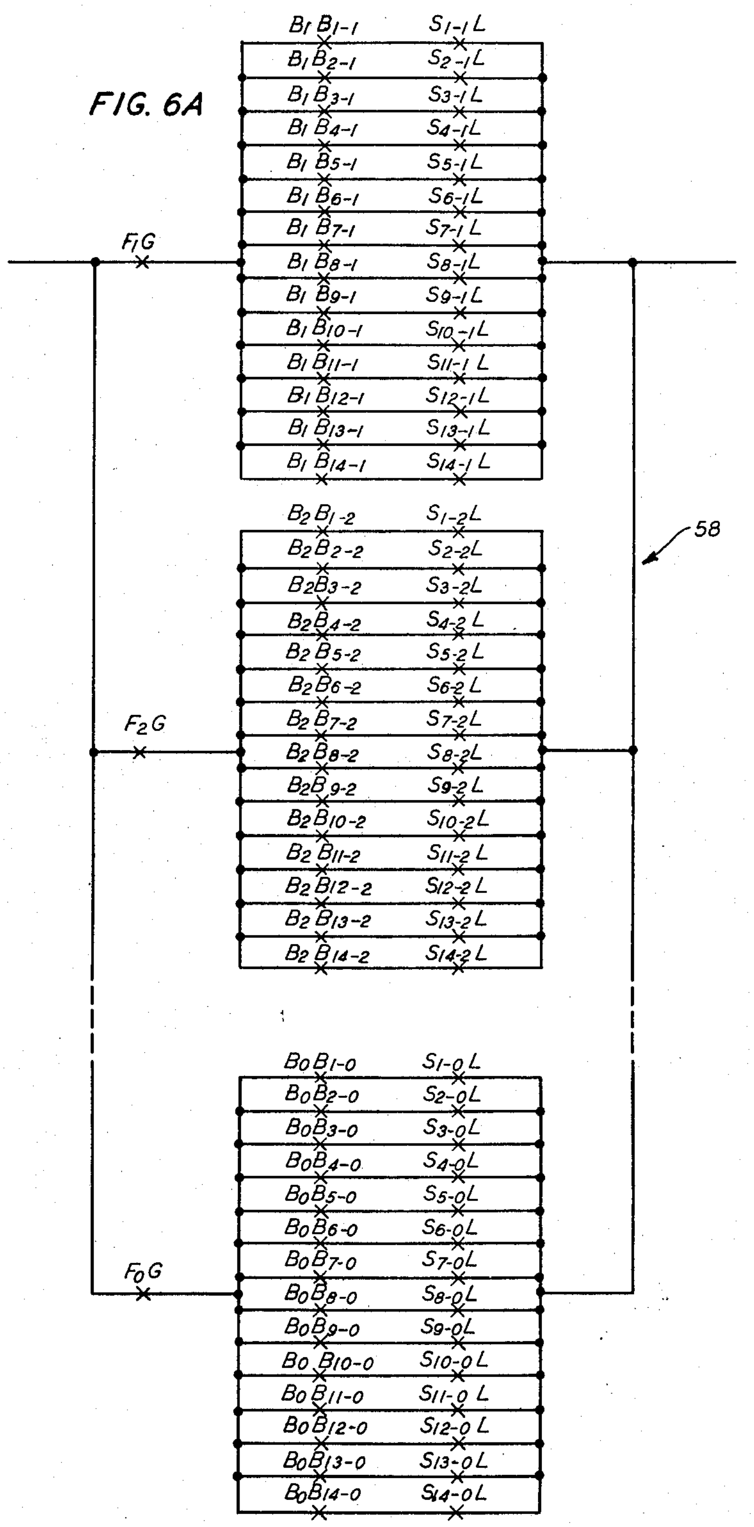
FIG. 6A is a more detailed schematic presentation of a portion of the switching matrix in FIG. 6.

Inasmuch as each conductor $B_{DV}$ is connected through the printed circuit board 15 to the corresponding conductor $S_{DV}$, each switch $B_VB_{DV}$ is connected in series with the corresponding switch $S_{DV}L$. Furthermore, as indicated in FIG. 6A, each group of switches $B_VB_{DV}$ is thereby connected to a corresponding group of switches $S_{DV}L$, the series connected pairs of switches $B_VB_{DV}$ and $S_{DV}L$ in the combined group being connected in parallel with each other.

Finally, inasmuch as conductor $B_V$ is connected to the corresponding conductor $F_V$, each combined group of switches $B_VB_{DV}$ and $S_{DV}L$ is connected in series with the corresponding switch $F_VG$, and each switch $F_VG$ and the combined group in series therewith is connected in parallel with each other switch $F_VG$ and the combined group in series therewith. This interconnection between the switches $S_{DV}L$, $B_VB_{DV}$, and $F_VG$ provides a switching matrix 58.

The switching matrix 58 is connected in series with a latching coil $C_L$ of a latching relay C and both the switching matrix and the latching coil are connected across a power source 60. In addition, an unlatching coil $C_U$ of the latching relay C is connected in series with the normally open sequence switch F'G' across the power source 60. Thus, when a path is provided through the switching matrix 58 the latching coil $C_L$ of the latching relay C is energized, and when the normally open sequence switch F'G' is closed the unlatching coil $C_U$ of the latching relay C is energized. The latching relay C actuates a normally closed relay switch C' that is connected in parallel with the pulsing switch P. The pulsing switch P is in turn connected in series with a hookswitch HS and telephone T across a telephone line. The energization of the latching coil $C_L$ results in the opening of the normally closed relay switch C' and the energization of the unlatching coil $C_U$ results in the closing of the relay switch.

The motor 55 is connectable accross the power source 60 by means of a normally open start switch ST or a normally open home switch H, the two switches being connected in series with the motor and in parallel with one another. The normally open start switch ST is manually closed, while the normally open home switch H is automatically closed when the motor 55 is energized and the call transmitted is displaced from the home position. The normally open home switch H thereupon remains closed until the call transmitter returns to the home position.

The first step in the operation of the call transmitter is the selection of the telephone number to be called. Referring to FIGS. 1 and 2, this is done by positioning the selector 14 for each digit so that the boss 30 thereof is aligned with the indicium corresponding to the value of the digit. The contacts 32 of each selector 14 thereby close the normally open selective switch $S_{DV}L$ corresponding to the selected value.

The call transmitter as illustrated is programmed to dial the telephone number 9 724 2165. The first digit 9 is to dial out of a private branch exchange, and because a second dial tone comes on the line following the dialing of this digit, the selectors 14 for the second and third digits are placed in the U position to provide a several second pause before the remaining digits of the telephone number are transmitted. The selectors 14 for the fourth through tenth digits are positioned according to the remaining digits of the telephone number. The selectors 14 for the eleventh through fourteenth digits are placed in the U position since they are unused.

Turning now to FIGS. 5 and 6, after the call transmitter has been programmed to call the desired telephone number, the handset of the telephone T is lifted, closing the hookswitch HS and connecting the telephone and the pulsing switch P across the telephone line. When the dial tone is heard, the start switch ST is manually closed whereby the motor 55 is connected across the power source 60. The motor 55 is energized, and the motor acting through the train of gears commences to rotate the cam 52 and the contacts $BB_1$ through $BB_0$, FF, and GG. The call transmitter is displaced from its home position, and the home switch H thereupon closes and provides an alternate connection for the motor 55 across the power source 60. Thus when the start switch ST is released, the motor 55 remains energized.

The rotating cam 52 opens the pulsing switch ten times a second. However, inasmuch as the normally closed relay switch C' provides an alternative path for the line current, the telephone line is not interrupted and no pulses are transmitted thereover.

As seen from FIGS. 3 and 4, the rotating contacts $BB_1$ through $BB_0$ initially only engage the conductors $B_V$, hence for about the first three seconds after the energization of the motor 55 none of the normally open sequential switches $B_VB_{DV}$ are closed. During this time, the contacts FF and GG make two complete revolutions, closing the normally open sequential switches $F_VG$ and the normally open sequential switch F'G' in sequence. The unlatching coil $C_U$ of the relay C is briefly energized by the closing of the normally open sequential switch F'G', but since the relay is already unlatched no change results therefrom.

Thereafter, the contacts $BB_0$, $BB_9$ and $BB_8$ engage and provide a path between the conductors $B_{1-0}$ and $B_0$, $B_{1-9}$ and $B_9$, and $B_{1-8}$ and $B_8$, closing the normally open sequential switches $B_0B_{1-0}$, $B_9B_{1-9}$, and $B_8B_{1-8}$. The contact FF then leaves the conductor FX and engages the conductor $F_0$, closing the normally open sequential switch $F_0G$. However, since the selector 14 for the first digit is positioned to dial the number 9, whereby the normally open selective switch $S_{1-9}L$ is closed, the normally open selective switch $S_{1-0}L$ is open and no path is provided through the switching matrix 58.

The contacts FF and GG move on and the contact FF engages the conductor $F_9$, closing the normally open sequential switch $F_9G$. A path is thereupon completed through the switching matrix, the path comprising the closed normally open selective switch $S_{1-9}L$, the closed normally open sequential switch $B_9B_{1-9}$, and the closed normally open sequential switch $F_9G$. The latching coil $C_L$ of the relay C is energized and the normally closed relay switch C' is thereby opened. Since the pulsing switch P is synchronized so that it is closed at the time that an individual switch $F_VG$ closes immediately after the relay switch C' opens, and the pulsing switch opens, the telephone line is interrupted to transmit a pulse thereover.

When the contact FF moves into the space between the conductor $F_9$ and $F_8$, the path through the switching matrix 58 is broken and the latching coil $C_L$ of the relay C is de-energized. The normally closed relay switch C' is latched open, however, and thus when the pulsing switch P again opens, a second pulse is transmitted.

A third, fourth, fifth, sixth, seventh, eighth, and ninth pulses are transmitted as the contacts FF and GG sequentially close the normaly open switches $F_7G$ through $F_1G$, the contacts $BB_7$ through $BB_1$ sequentially close the normally open switches $B_7B_{1-7}$ through $B_1B_{1-1}$, and the pulsing switch P is opened and closed in synchronism therewith.

Then after the transmission of the ninth pulse, the contact FF moves from the conductor $F_1$ to the conductor F' and the contact GG moves from the conductor G to the conductor G'. The normally open sequential switch F'G' is thereby closed and the unlatched coil $C_U$ of the relay C is energized. The relay switch C' is returned to its normally closed condition, and the pulsing switch P is once again shunted, terminating the transmission of pulses. The relay switch C' of course remains closed when the contacts FF and GG thereafter respectively move from the conductors F′ and G′, opening the closed normally open sequential switch F′G′ and de-energizing the unlatching coil $C_U$ of the relay C.

The contacts FF and GG upon leaving the conductors F′ and G′ engage the conductor FX and G respectively. Since the conductor FX is not connected in the circuit, no pulsing can occur during the entire time that the contact FF is in engagement therewith, and this provides the interdigital period.

The selector 14 for the second digit is in the U position and therefore it does not serve to close any of the normally open selective switches $S_{DV}L$ associated therewith. As a result, no path can be completed through the switching matrix 58 during the sequential actuation of the normally open switches $B_0B_{2-0}$through $B_1B_{2-1}$ and the concurrent sequential actuation of the normally open switches $F_0G$ through $F_1G$. The relay switch C′ remains in its normally closed condition, preventing the opening of the pulsing switch P from interrupting the telephone line.

The third through fourteenth digits are dialed in a similar manner to that described above, and shortly after the fourteenth digit, the call transmitter returns to its home position. The closed normally open home switch H thereupon opens, disconnecting the motor 55 from the power source 60, and the motor is de-energized.

Although but one specific embodiment of the invention has been shown and described, it will be understood that it is but illustrative and that various modifications may be made therein without departing from the scope and spirit of this invention as defined by the appended claim.

What is claimed is:

1. A code transmitter comprising:

a plurality of first switches selectively actuated;

a plurality of second switches sequentially actuated, each second switch being serially connected to an individual first switch and the pairs of serially connected first and second switches being arranged in groups in which the pairs of serially connected first and second switches are in parallel with one another;

a plurality of third switches sequentially actuated, each third switch being connected in series with an individual group of first and second switches, each third switch and the group in series therewith being connected in parallel with each other third switch and the group in series therewith to provide a switching matrix, a path being provided through the switching matrix when a first, second, and third switch that are connected in series with one another are actuated simultaneously;

a signal generator;

a normally open interdigital switch that is briefly closed at the end of each sequential actuation of the third switch; and a latching relay comprising a normally closed relay switch, a latching coil for opening the relay switch, and an unlatching coil for closing the relay switch, the relay switch being connected in parallel with the signal generator and normally providing a short thereacross to disable the signal generator, the latching coil being connected in series with the switching matrix across a power source whereby the completion of a path through the switching matrix energizes the latching coil to open the relay switch and enable the signal generator, and the unlatching coil being connected in series with the interdigital switch across a power source, whereby the unlatching coil is briefly energized at the end of each sequential actuation of the third switches to reclose the relay switch and disable the signal generator.

References Cited

UNITED STATES PATENTS

| | | | |
|---|---|---|---|
| 3,078,349 | 2/1963 | Sasaki | 179—90 |
| 3,305,644 | 2/1967 | Watanabe | 179—90 |
| 3,366,747 | 1/1968 | Holzer | 179—90 |
| 3,418,431 | 12/1968 | Hershey. | |

KATHLEEN CLAFFY, Primary Examiner

T. J. D'AMICO, Assistant Examiner